US012755459B2

(12) United States Patent
Minarik et al.

(10) Patent No.: US 12,755,459 B2
(45) Date of Patent: Oct. 6, 2026

(54) VOICE-BASED CONTENT DESIGN USING GENERATIVE ARTIFICIAL INTELLIGENCE TECHNIQUES

(71) Applicant: Dell Products L.P., Round Rock, TX (US)

(72) Inventors: Jennifer Marie Minarik, Zionsville, IN (US); Jehuda Shemer, Kfar Saba (IL); Rahul Sapkal, Acton, MA (US); Punith Puttappa, Hassan (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/084,957

(22) Filed: Mar. 20, 2025

(65) Prior Publication Data

US 2026/0289846 A1 Sep. 24, 2026

(51) Int. Cl.
*G06T 11/60* (2026.01)
*G06T 11/26* (2026.01)
*G10L 15/22* (2006.01)

(52) U.S. Cl.
CPC .............. *G06T 11/60* (2013.01); *G06T 11/26* (2026.01); *G10L 15/22* (2013.01); *G06T 2200/24* (2013.01); *G10L 2015/223* (2013.01)

(58) Field of Classification Search
CPC ... G06T 11/60; G06T 11/206; G06T 2200/24; G10L 15/22; G10L 2015/223
USPC .......................................................... 345/156
See application file for complete search history.

(56) References Cited

U.S. PATENT DOCUMENTS

2025/0218139 A1* 7/2025 Kharbanda ........... G06T 19/006
2025/0315428 A1* 10/2025 Lyer ...................... G06F 16/243
2025/0363295 A1* 11/2025 Sen ....................... G06F 16/316

OTHER PUBLICATIONS

"Generative AI Models Explained"; AltexSoft Editorial Team; Data Science; Sep. 4, 2024.
Davenport et al.; "How Generative AI is Changing Creative Work"; Business and Society; Nov. 14, 2022.
Hartmann et al.; "The Power of Generative Marketing: Can Generative AI Create Superhuman Visual Marketing Content?" International Journal of Research in Marketing; Science Direct; Sep. 20, 2024.

* cited by examiner

*Primary Examiner* — Mark Edwards
(74) *Attorney, Agent, or Firm* — Ryan, Mason & Lewis, LLP

(57) ABSTRACT

Techniques are provided for voice-based content design using generative artificial intelligence (AI). One method comprises accessing a data structure comprising information characterizing vocal instructions of a user; applying the information to a generative AI model, wherein the generative AI model employs at least one generator that generates content, comprising one or more generated objects, for presentation to the user, based on the vocal instructions of the user, and wherein, in response to at least one of a creation, a deletion and a modification of a generated object in the generated content, the generative AI model adds a reference point to the generated content; and modifying, using the generative AI model, the generated content based on information characterizing at least one additional vocal instruction of the user. The reference point in the generated content may comprise a decision point, a split point, a named placeholder and/or a checker point.

20 Claims, 8 Drawing Sheets

500

AI MODEL PROMPT

YOUR ROLE IS TO PARSE INSTRUCTIONS FROM A USER AND TO GENERATE AND UPDATE CONTENT BASED ON THE INSTRUCTIONS OF THE USER. A TIMELINE MAY PROVIDE A RECORD OF EVENTS AND MAY ALLOW USERS TO TRAVERSE THROUGH TIME BY SELECTING A GIVEN EVENT IN THE TIMELINE. REFERENCE POINTS MAY BE USED TO VISUALLY IDENTIFY PORTIONS OF THE GENERATED CONTENT. THE GENERATED CONTENT MAY BE DISPLAYED TO THE USER USING DIFFERENT VIEWS BASED AT LEAST IN PART ON USER INSTRUCTIONS REGARDING HOW THE GENERATED CONTENT SHOULD BE DISPLAYED.

THE REFERENCE POINTS MAY COMPRISE DECISION POINTS, SPLIT POINTS, VISUAL NAMED PLACEHOLDERS AND CHECKER POINTS.

WHEN THE INSTRUCTIONS FROM THE USER CREATE, DELETE AND/OR SIGNIFICANTLY MODIFY AN OBJECT IN THE GENERATED CONTENT, ADD A BRIEF DESCRIPTION OF THE EVENT IN THE TIMELINE WITH A TIMESTAMP AND GENERATE ONE OR MORE CORRESPONDING REFERENCE POINTS IN THE GENERATED CONTENT.

OUTPUT FORMAT:
PROVIDE A VISUAL OUTPUT OF THE GENERATED CONTENT FOR THE USER, SUCH AS THE VISUAL OUTPUT SHOWN IN FIG. 4, BASED AT LEAST IN PART ON THE USER INSTRUCTIONS AND THE VIEW SPECIFIED BY THE USER, OPTIONALLY WITH A REPRESENTATION OF THE INSTRUCTIONS FROM THE USER, A TIMELINE AND ONE OR MORE REFERENCE POINTS.

FIG. 5

VOICE-BASED CONTENT DESIGN USING GENERATIVE ARTIFICIAL INTELLIGENCE TECHNIQUES

BACKGROUND

As the value and use of information continues to increase, individuals and organizations seek additional ways to process and/or store information. Information processing systems may be used to process, compile, store and/or communicate various types of information, for example, including through the use of artificial intelligence (AI) and/or machine learning (ML).

SUMMARY

Illustrative embodiments of the disclosure provide techniques for voice-based content design using generative AI. One method includes accessing at least one data structure comprising information characterizing at least a portion of one or more vocal instructions of a user; applying at least a portion of the information to at least one generative AI model, wherein the at least one generative AI model employs at least one processor-based content generator that generates content, comprising one or more generated objects, for a visual presentation to the user, based at least in part on the one or more vocal instructions of the user, and wherein, in response to at least one of a creation, a deletion and a modification of at least one generated object in the generated content by the one or more vocal instructions of the user, the at least one generative AI model adds at least one visual reference point to the generated content; and modifying, using the at least one generative AI model, at least a portion of the generated content based at least in part on information characterizing at least one additional vocal instruction of the user.

Illustrative embodiments can provide significant advantages relative to conventional techniques. For example, technical problems related to such conventional techniques are mitigated in one or more embodiments by employing generative AI models that generate content based at least in part on one or more vocal instructions of a user.

These and other illustrative embodiments described herein include, without limitation, methods, apparatus, systems, and computer program products comprising processor-readable storage media.

BRIEF DESCRIPTION OF THE DRAWINGS

FIG. 5 illustrates a representative AI model prompt in accordance with an illustrative embodiment;

DETAILED DESCRIPTION

Figure 1:
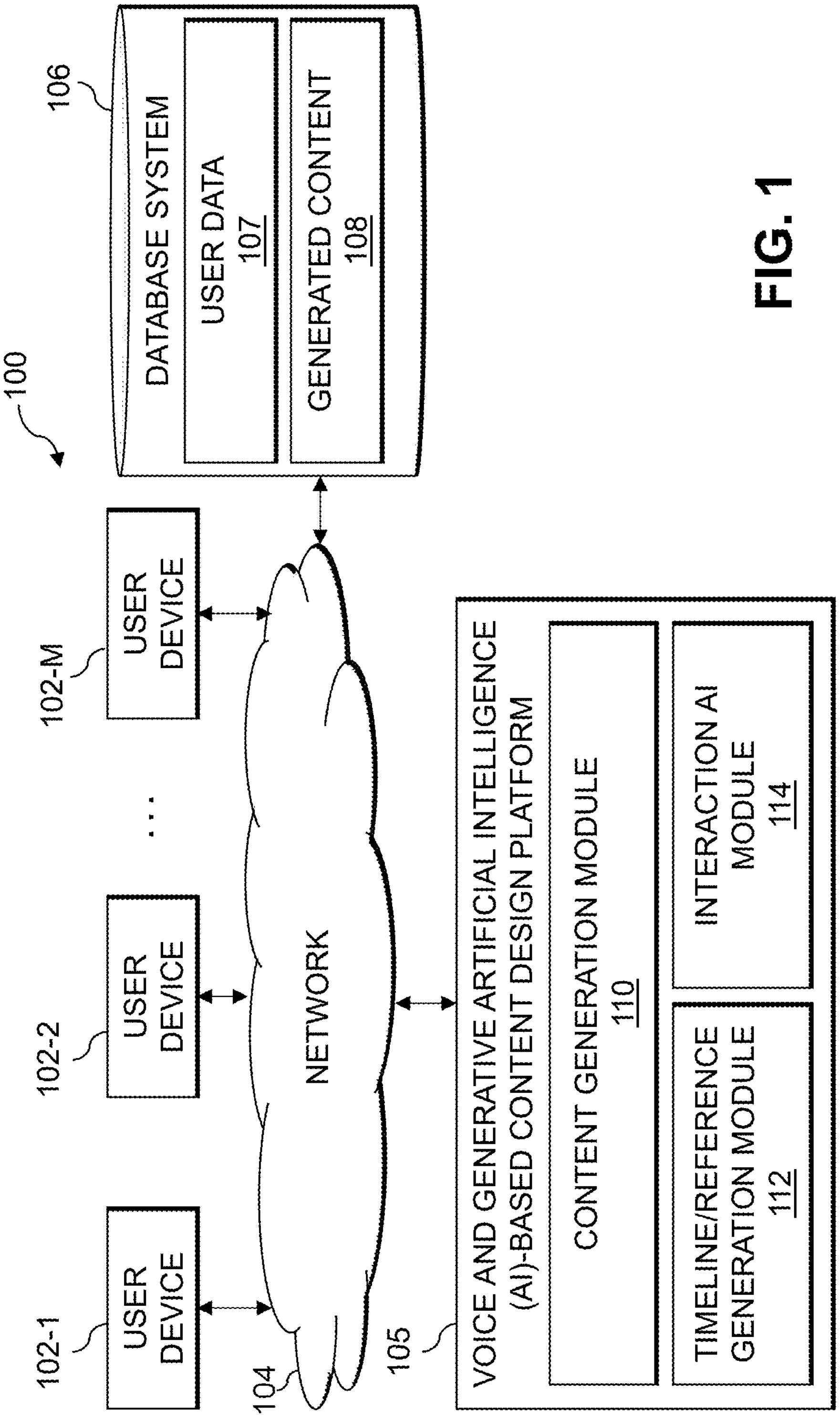
FIG. 1 illustrates an information processing system configured for voice-based content design using generative AI techniques in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for voice-based content design using generative AI techniques.

In some embodiments, voice-based instructions of a user are provided as input to a voice and generative AI-based content design system. Visual cues and generative AI may be employed to provide feedback to the user while automatically generating content based on the user's vocal instructions (e.g., without interrupting the user flow).

A voice-based user experience (UX) tends to be "voice command-based" or "turn-based," whereby the user provides a short command or prompt, while the system delivers the request (sometimes referred to as a synchronous exchange or a "you go, I go" format). If there are any parameters that the system needs, the system will respond (typically using sound) to ask for any additional required information and then wait for the user to provide the additional required information. Such an experience is well suited for simple interactions, such as interactions of the form "do this" or "I want that."

Another common form of voice interaction is with dictation services (e.g., that perform a speech-to-text function), where the user speaks to the dictation system, and the dictation system transcribes the conversation into a textual format. Some dictation systems also understand formatting cues, such as "new paragraph," "new page," and/or "question mark." Such a dictation interaction may provide a continuous experience but typically works well only in the context of a linear document. Such dictation systems tend to struggle when a user input is not provided in order, and editing is difficult. Consequently, users tend to vocalize their thoughts to obtain them in text form and then manually edit the result using a text editor. As used herein, the term "continuous" shall be broadly construed to encompass a user speaking without being interrupted by the voice and generative AI-based content design system but shall not require that the user speak without taking a pause or shall not prevent the voice and generative AI-based content design platform from interacting visually with the user (or in another non-verbal manner).

In at least some embodiments, the disclosed voice and generative AI-based content design platform may employ generative AI techniques to provide a substantially continuous speech-based experience for the user. Reference points may be used to visually identify portions of the generated content (e.g., text and/or presented content) that are expected to be confirmed, revisited and/or modified by the user later. The reference points may comprise decision points, split points, visual named placeholders (including implicit placeholders) and/or checker points.

For example, decision points (e.g., named points in the text flow) may be used whenever the voice and generative AI-based content design platform makes an assumption or uses a value that is likely to change. Split points may be employed that correspond to multiple options that are generated in parallel (e.g., to compare alternatives and/or "what if" scenarios), where the split point and each of the parallel options, for example, may have a name associated with them. Split points may be employed, for example, when there are multiple options (e.g., parameter values) with fairly similar likelihoods. As used herein, the term "named" shall be broadly construed to encompass a number, a name, an identifier, an icon (e.g., a graphic), a color, or any identification that will allow a user to reference an object or entity at a later time, as would be apparent to a person of ordinary skill in the art.

In one or more embodiments, the disclosed voice and generative AI-based content design platform may employ visual named placeholders for an entity that the voice and generative AI-based content design platform does not know how to handle. Checker points may be employed to identify points where missing or contradictory information is found (e.g., to maintain the consistency of the model being generated).

Generative AI techniques may be employed to generate content based at least in part on a vocal input of the user and/or to enhance the user interaction in parallel with the content generation. The voice and generative AI-based content design platform may generate and update the displayed output (e.g., in a substantially continuous manner), allowing the user to adjust and supply more information, thereby creating a continuous loop of interaction. The generated content may be displayed to a user using different views (e.g., diagrams, three-dimensional views (isometry or projections), level-of-detail designations, color views, black and white views, skeleton/detail views, or parts of subsystems or areas in a larger design) and users may create additional views, as needed, referenced by a view name. For example, a user may instruct the AI models to present a front or a side view. It is noted that user instructions related to the view do not modify the generated content itself and only adjust how the generated content is presented.

A timeline may be employed in some embodiments to organize user inputs (e.g., associated with significant events) according to time, thereby allowing a user to go back in time, or forward in time, sometimes referred to as time travel. In addition, a user may use the timeline to edit original assumptions and/or decisions and to see the impact of such edits on the resulting generated content. In this manner, the disclosed voice and generative AI-based content design platform enables decisions and assumptions that were made in the past to be changed by the user, which will then initiate a reevaluation of the generated output and affect the interpretation of subsequent text (e.g., as the generated content is evolving).

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a voice and generative AI-based content design platform 105 and a database system 106.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The voice and generative AI-based content design platform 105 may comprise a content generation module 110, a timeline/reference generation module 112 and an interaction AI module 114. The content generation module 110, in some embodiments, may generate content based at least in part on one or more vocal instructions of a user, as discussed further below in conjunction with FIG. 2, for example. In at least some embodiments, the timeline/reference generation module 112 may add a timeline and/or one or more reference points to generated content, based at least in part on one or more vocal instructions of a user, as discussed further below in conjunction with FIG. 4, for example. In one or more embodiments, the interaction AI module 114 may process instructions that relate to how given content should be displayed (e.g., as opposed to what content to generate), as discussed further below in conjunction with FIG. 2, for example.

The term "language model" in this context and elsewhere herein is intended to be broadly construed so as to encompass, for example, natural language processing models that are trained on massive amounts of data (e.g., possibly hundreds of gigabytes or more) to understand, summarize, generate and/or predict new content (e.g., generated content). Such language models are also commonly referred to as large language models. Language models often are implemented using transformer-based architectures. Transformer-based architectures can process input through a sequence of transformers, where each transformer includes a self-attention layer and feed-forward layer. The self-attention layer computes an importance of each token in a sequence of input tokens, and the feed-forward layer transforms the output of the self-attention layer into a form suitable for the next transformer in the sequence. It is noted that this is merely one example of a language model architecture, and other architectures can also be used, such as Long Short-Term Memory (LSTM) architectures.

It is to be appreciated that this particular arrangement of modules 110, 112 and/or 114 illustrated in the voice and generative AI-based content design platform 105 of the FIG. 1 embodiment is presented by way of example only, and alternative arrangements can be used in other embodiments. For example, the functionality associated with the modules 110, 112 and/or 114 in other embodiments can be combined into a single module, or separated across a larger number of modules. As another example, multiple distinct processors can be used to implement different ones of the modules 110, 112 and/or 114 or portions thereof.

At least portions of modules 110, 112 and/or 114 may be implemented at least in part in the form of software that is stored in memory and executed by a processor.

Additionally, the database system 106 may comprise one or more databases, such as a user data database 107 (e.g., comprising information characterizing one or more users of an organization) and generated content database 108 (e.g., comprising information characterizing content generated using the disclosed voice-based content design using generative AI techniques). The databases 107 and 108 may be configured to store data, for example, in tables, in a known manner. While the databases 107 and 108 are illustrated in FIG. 1 as comprising distinct databases, at least portions of the databases 107 and 108 may be implemented using a single database (e.g., different parts of a single database). Example databases 107 and 108, such as depicted in the present embodiment, can be implemented using one or more storage systems associated with the voice and generative AI-based content design platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the voice and generative AI-based content design platform 105 are one or more input-output devices, which illustratively comprise keyboards, displays or other types of input-output devices in any combination. Such input-output devices can be used, for example, to support one or more user interfaces to the voice and generative AI-based content design platform 105, as well as to support communication between voice and generative AI-based content design platform 105 and other related systems and devices not explicitly shown.

Additionally, the voice and generative AI-based content design platform 105 in the FIG. 1 embodiment is assumed to be implemented using at least one processing device. Each such processing device generally comprises at least one processor and an associated memory, and implements one or more functional modules for controlling certain features of the voice and generative AI-based content design platform 105.

More particularly, the voice and generative AI-based content design platform 105 in this embodiment can comprise a processor coupled to a memory and a network interface.

The processor illustratively comprises a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage drive, a storage array or an integrated circuit containing memory, as well as a wide variety of other types of computer program products. The term "article of manufacture" as used herein should be understood to exclude transitory, propagating signals. These and other references to "drives" herein are intended to refer generally to storage devices, including solid-state drives (SSDs), and should therefore not be viewed as limited in any way to particular storage media types.

The network interface allows the voice and generative AI-based content design platform 105 to communicate over the network 104 with the user devices 102, and illustratively comprises one or more conventional transceivers.

It is to be understood that the particular set of elements shown in FIG. 1 for the voice and generative AI-based content design platform 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the voice and generative AI-based content design platform 105 and at least portions of the database system 106 can be on and/or part of the same processing platform.

Figure 2:
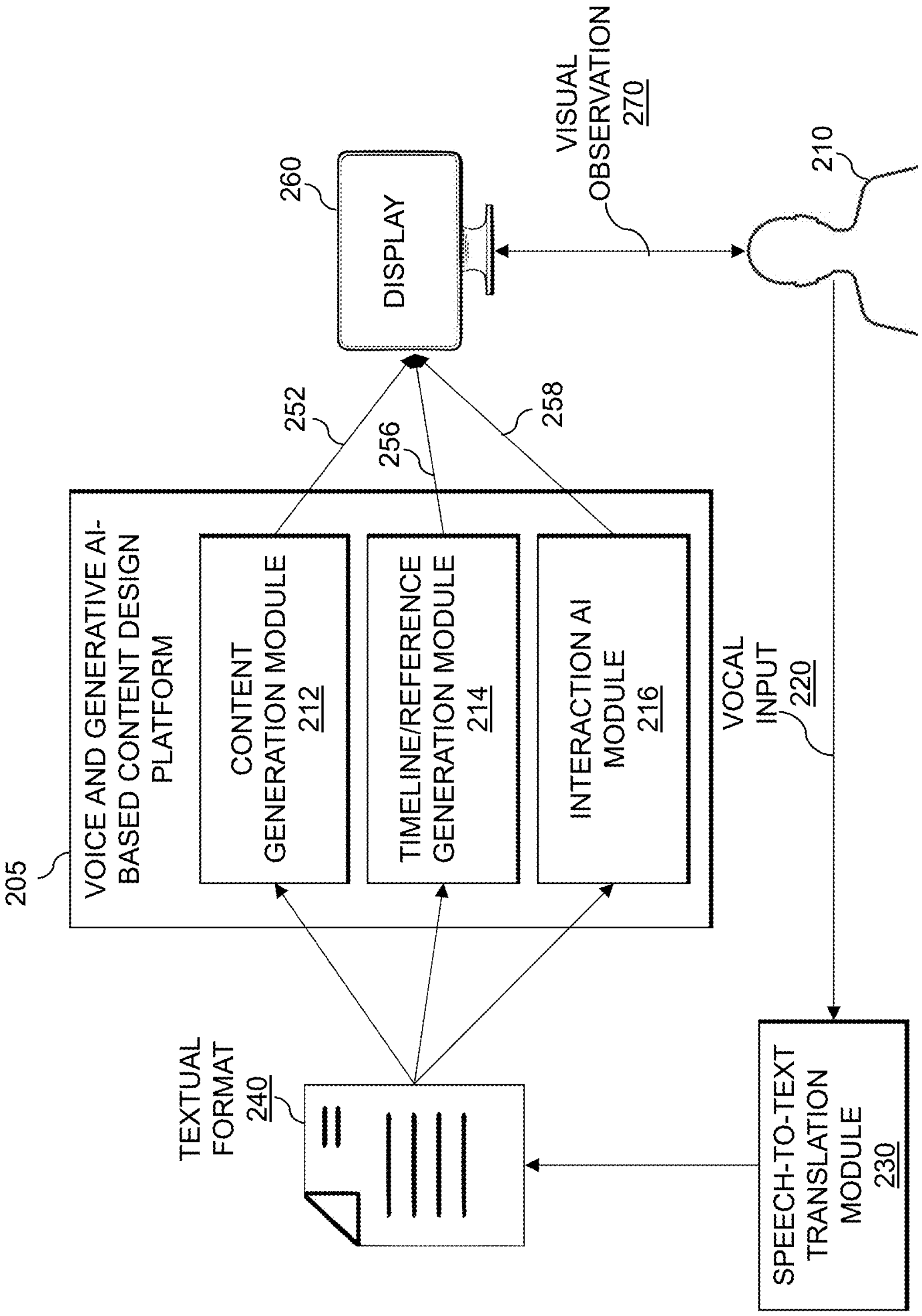
FIG. 2 illustrates the voice and generative AI-based content design platform of FIG. 1 in further detail in accordance with an illustrative embodiment.

FIG. 2 illustrates the voice and generative AI-based content design platform of FIG. 1 in further detail in accordance with an illustrative embodiment. In the example of FIG. 2, a user 210 provides a vocal input 220 to a voice and generative AI-based content design platform 205, for example, using a microphone (not shown). The vocal input 220 (e.g., one or more instructions on how to generate and/or modify the desired content, such as a house design) may be applied to a speech-to-text translation module 230 that transcribes the vocal input 220 into a textual format 240. As shown in FIG. 2, the voice and generative AI-based content design platform 205 may comprise a content generation module 212, a timeline/reference generation module 214 and an interaction AI module 216.

It is to be appreciated that this particular arrangement of modules 212, 214 and/or 216 illustrated in the voice and generative AI-based content design platform 205 of the FIG. 2 embodiment is presented by way of example only, and alternative arrangements can be used in other embodiments. For example, the functionality associated with the modules 212, 214 and/or 216 in other embodiments can be combined into a single module, or separated across a larger number of modules. As another example, multiple distinct processors can be used to implement different ones of the modules 212, 214 and/or 216 or portions thereof.

At least portions of modules 212, 214 and/or 216 may be implemented at least in part in the form of software that is stored in memory and executed by a processor.

There are multiple ways to generate the textual format 240 of the vocal input 220 of the user 210. For example, the speech-to-text translation module 230 may be employed to transform regular speech into text which is then added to a text transcript. In addition, the textual format 240 of the vocal input 220 may be applied to one or more of the content generation module 212, the timeline/reference generation module 214 and the interaction AI module 216, to determine what to do with the transcribed user input. For example, the transcribed user input may be parsed to determine if the transcribed user input comprises an interaction command or content to be inserted in the generated output. In this manner, a feedback loop is provided, whereby the user sees the generated content and visual cues and responds using speech to adjust the process, as discussed further below.

In other embodiments, the vocal input 220 may be obtained using pre-recorded voice and/or the textual format 240 may be obtained using pre-transcribed text. Such inputs may replace existing inputs or be in addition to such existing inputs. It is noted that when the vocal user input is given continuously, longer-term semantics may be used. As opposed to the "do that" or "tell me this" commands that turn-based systems use, the continuous transcript employed by the present disclosure provides options and a tendency to set ground rules that may apply to multiple future situations. Such pre-recorded voice and/or pre-transcribed text may be used to seed or enhance the transcript of the vocal input 220 from the user 210. For example, the pre-recorded voice and/or pre-transcribed text may be obtained from articles, blogs, or descriptions obtained by other sources that can be used to describe components or concepts. In addition, recordings or transcripts of meetings may be employed that may be unrelated to the interaction with the above-described voice and generative AI-based content design platform 205. If a particular topic was discussed in a meeting, the context together with the meeting transcript may be imported into the voice and generative AI-based content design platform 205 and used to guide the content design and generation.

Other interaction options may comprise images and/or video feeds. For example, interaction with gestures may be captured from a video feed, and the gestures would likely be in the interaction space. Images or videos can be used to describe elements (e.g., "the display layout should look something like this") and the user can provide an image or video of a hand-drawn diagram or a reference to a stored image, for example. Further, a video recording of a discussion between two or more people may be used and the voice track and possible gestures in the video or artifacts visible in the video may be used as input points.

In some embodiments, at least portions of the textual format 240 may comprise speech (e.g., the vocal input 220, or portions thereof, of the user 210) that may be directly processed by one or more of the content generation module 212, the timeline/reference generation module 214 and the interaction AI module 216. Thus, in some embodiments, the speech-to-text translation module 230 may be optional (and/or may process various input formats and generate one or more output formats). A representative output of the voice and generative AI-based content design platform 205 is discussed further below in conjunction with FIG. 4.

The textual format 240 (or portions thereof) may be applied (e.g., in parallel) to the content generation module 212, the timeline/reference generation module 214 and the interaction AI module 216. As discussed further below, the content generation module 212 generates visual content 252 based at least in part on the vocal input 220 of the user 210. The generated visual content 252 (or portions thereof), generated at least in part by the content generation module 212, may be presented to the user 210 on a display 260.

In some embodiments, the user 210 may make visual observations 270 with respect to the generated visual content 252 presented on the display 260, and may modify the generated visual content 252 using a vocal input 220 (e.g., one or more instructions on how to modify the generated content). In this manner, a feedback loop may be created by the user 210 seeing the generated content on the display 260 and giving instructions on how to adjust or change the generated content presented on the display 260. The instructions do not have to be related directly to the generated content, and comments from the user may be provided later or out-of-sequence. The system can integrate the various inputs and dynamically regenerate the modified generated content.

The textual format 240 (or portions thereof) of the vocal input 220 of the user 210, from the speech-to-text translation module 230, may be processed in some embodiments to generate a consolidated prompt that is applied by the content generation module 212. The content generation module 212 may process the consolidated prompt to generate the visual content. The content generation module 212 may be implemented, at least in part, using one or more generative pre-trained transformers (GPTs), such as those associated with the content that the system is targeting (e.g., text, image and/or other content generation modules or generators), as discussed further below in conjunction with FIG. 3. An image generator, for example, may be tailored for generating images, as would be apparent to a person of ordinary skill in the art.

The content generation module 212 may employ display instructions, such as visual instructions, color selections, and/or "look and feel" instructions. For example, a user 210 may instruct the voice and generative AI-based content design platform 205 to display all objects in the generated content as rounded black boxes with the name in the top left corner, or to use dark mode after 6:00 μm. In addition, the content generation module 212 may employ one or more principles or logic instructions, such as object relationships, constants and defaults, and logic rules to maintain on other objects. For example, a user may instruct the voice and generative AI-based content design platform that when an object is added to the generated content, the added object may have a type field, an internal sub-module named "manager," and a "REST API". Further, instructions given with respect to objects may override instructions given in the main system view in at least some embodiments.

In one or more embodiments, the textual format 240 (or portions thereof) of the vocal input 220 of the user 210, from the speech-to-text translation module 230, may also be applied to the timeline/reference generation module 214. The timeline/reference generation module 214 may be implemented as a large language model (LLM)-based AI system (e.g., at least one LLM and one or more associated GPT generators, in a similar manner as ChatGPT) that uses summaries and content extraction to find key points in the textual format 240 (e.g., a user transcript).

As noted above, reference points may be used by the voice and generative AI-based content design platform 205 to visually identify portions of the generated output (e.g., text and/or presented content) that are expected to be confirmed, revisited and/or modified by the user later. Thus, reference points may be considered labels or tags that may be added automatically by the timeline/reference generation module 214 or may be explicitly defined by the user. Reference points designate points of interest, to allow the user to instruct the voice and generative AI-based content design platform 205 to revisit those reference points and perhaps change the decisions or values set at those points.

A reference point may have a visual cue that may appear in the graphical display area in the context of the objects being displayed. A given reference point may also appear in the transcript and/or the timeline. The reference point identifier can be a number, name, identifier, graphic icon, vary in color, or any identification that will allow a user to reference the reference point at a later time. The identifier can also be changed (renamed) by the user at any time.

The timeline/reference generation module 214 may process the content generated by the content generation module 212 to identify when new entities (e.g., objects) are created or significantly modified. For such new and/or modified entities, the timeline/reference generation module 214 generates tagged reference points 256 for later interaction, as discussed further below, and optionally places short summaries in the timeline (e.g., to facilitate editing capabilities). For example, if a user 210 instructs the voice and generative AI-based content design platform 205 to insert a square (or another entity or object) in a design, the content generation module 212 may insert a square with a particular color and dimension selected by the content generation module 212. The additional options that may be available for the square (e.g., additional colors and/or dimensions) may be added by the timeline/reference generation module 214 as part of a reference point 256 (e.g., as a named decision point, associated with the newly added entity) so that the newly added entity can be referenced by the user later (e.g., to change one or more of the default or initial values).

The timeline/reference generation module 214 may process a pre-prompt (e.g., a persistent prompt that guides the behavior of the AI models for all users) that instructs the timeline/reference generation module 214 to parse the transcribed text and create at least one type of reference point 256 (e.g., a decision point, a split point, a visual named placeholder and/or a checker point) in the generated content each time an object or element in the model being generated is created, deleted or modified (or whenever a command or function is otherwise given), as discussed further below in conjunction with FIG. 5. The pre-prompt can also instruct the timeline/reference generation module 214 to parse the transcribed text and create a time-stamped list of events during the evolution of the model, as discussed further below.

In other embodiments (e.g., where there is a parameter with two or three options with similar likelihoods and no preference indicated for a selection of the parameter value), the timeline/reference generation module 214 may add a split point to show multiple options in parallel. For example, the user 210 may ask the voice and generative AI-based content design platform 205 to compare alternatives or to perform "what if" scenarios. Each of the alternatives or scenarios associated with a given named split point may be presented in the generated content in parallel. A user instruction (e.g., associated with generating a user interface) may ask to see how the generated content looks in regular mode and dark mode. The content generation module 212 and/or the timeline/reference generation module 214 may generate the output for both options in parallel (e.g., side by side). Another example is if the user instruction suggests that a given architecture can be a microservices approach or a monolithic approach.

As described herein, the textual format 240 of the vocal input 220 applied to the content generation module 212 and/or the timeline/reference generation module 214 may define rules and/or principles. Once such rules are in place, they can be upheld automatically as the textual format 240 of the vocal input 220 is processed. Whenever a conflict with one or more rules and/or principles is identified, the timeline/reference generation module 214 may generate a named checker point to identify the concern and to give the user 210 the option to resolve or clarify any issues. If there is missing information, for example, the voice and generative AI-based content design platform 205 may behave like a decision point described above, for example.

The timeline/reference generation module 214 may also generate a timeline as a part of the generated content having, for example, a time-stamped list of events during the evolution of the model (e.g., the addition of one or more named reference points to the generated content). The time-stamped event list can contain model-changing events and interaction events (which may optionally be filtered, for example, using a significance score). Newly created reference points may appear as line items in the timeline (although all reference points do not necessarily have to appear there, it is expected that reference points often correlate with significant events). Entries in the timeline may be brief in nature. The LLM capabilities, for example, may be employed to create short descriptions of each event for use in the timeline. In at least one embodiment, the timeline may be employed to display events, and to traverse through time (e.g., forward or backward in time), for example, by selecting an event displayed in the timeline, to revisit choices or assumptions (which may then re-render all the models). The changes may not alter the actual timeline (a given change will have a new entry at the end of the timeline) but rather may be applied as the change was made at the original time. The timeline allows users to control the granularity of the displayed items. A coarse resolution may display fewer items with more importance, while a higher resolution may provide more detailed items. It is possible to display higher resolution items as a hierarchy (e.g., collapsing finer resolution items in lower levels of the tree).

There may be times when the transcription of the vocal input stream applied to the content generation module 212 and/or the timeline/reference generation module 214 references objects, modules, or other concepts that have not been defined yet. In some embodiments, the timeline/reference generation module 214 may create a named placeholder for each undefined entity. Once the named placeholder is created (and added to the timeline), the user can reference the named placeholder and provide details that will materialize the named placeholder into a proper entity.

The interaction, in some embodiments, that comprises the user input flow should be substantially uninterrupted. Thus, there may be places where the voice and generative AI-based content design platform 205 may need additional information or have questions. To avoid interruption, the voice and generative AI-based content design platform 205 will use default values or decide on values to use automatically. In these locations, the decision point may be marked and automatically named to allow the user to revisit the decision point later, and/or the decision or question may pop up on the screen (e.g., using a balloon or callout) in connection with the decision point. As a result, the user sees that a decision has been made and also gets a chance while providing vocal instructions to address the contents of a given decision point, by just giving values or instructions that will help the behavior be more accurate according to their needs (with or without explicitly stating the name of the decision point).

In a situation where there is a parameter with two or three options and there is no preference indicated for a selection of the parameter value, the timeline/reference generation module 214 may decide to split and show multiple options in parallel. This is also applicable if the user asks to compare alternatives or to perform "what if" scenarios. Each of the above scenarios results in a split point, with each split getting a name associated with it. For example, if the user instruction asks to see how the generated content looks in regular mode and dark mode, the interactive voice-based content design system will generate the output for both options in parallel (e.g., side by side). Another example is if the user instruction suggests that the architecture can be a Microservice approach or a layered approach. Further, the user instruction may specify that the boxes should all use a primary color, which may either select one color or split to red/blue/green in parallel.

There may be times when the stream of vocal input 220 from the user 210 is received referencing objects, modules, or even concepts that have not been defined yet. In any such case, the timeline/reference generation module 214 may create a named placeholder to fill in. When the placeholder is created, the user can reference the placeholder and give details that will materialize the placeholder into a proper entity.

In at least some embodiments, once a definition of a placeholder is provided (or contemporaneous with the definition of the placeholder being given), the placeholder is modified as if going back in time. Any operations that were performed on the placeholder when the placeholder was undefined may be reapplied to the placeholder and may get a different meaning now that the placeholder has been defined (or conflicts can emerge). For example, if a placeholder for an entity "toy" was previously generated and now the user states that the entity "toy" must have a shape of a circle, then previous statements of putting other entities next to the toy, or at a corner of the toy, may have different or conflicting meanings that need to be resolved (e.g., a meaning of a corner of a circle may need to be addressed and/or resolved). It is noted that multiple instances of a placeholder may evolve at once (e.g., a user may have stated to place the entity "toy" in many places, and all such instances may be materialized in parallel).

In another example, there may be a content generation project comprising a system with only a "processing service" defined. The user may provide an input specifying that the processing service will provide information to management on the progress of the processing. There are two undefined explicit entities here. It is unclear whether "management" is another service, a different system and/or actual management people, or whether "information" is a well-defined object or a structured information and the cadence that the information will be provided. For each of the above entities, a placeholder may be created and named, and its nature will be determined at a later time. For example, the user may later specify that "when the information is received by the management service, the management service can display the information to users of the system."

From this, it becomes clear that "management" is another service, and the placeholder can be modified to reflect that.

Other implicit placeholder entities may be created. With reference to the example above, the information sent by the processing service to the management service may need a communication channel, or perhaps a queue or storage for that message. Placeholders may be generated for these entities as well. Care should be taken to avoid exploding the model with implicit entities as these may get out of control.

As discussed above, there were examples of rules and principles that can be defined. Once there are rules in place, they can be upheld automatically as new items come in, but also there may be rules that may contradict each other in certain conditions, or that there may be missing information to apply things correctly. Whenever such a condition is identified, a checker point may be created by the timeline/reference generation module 214 to explain the concern and give the user the option to resolve or clarify the contradiction and/or missing information. If there is missing information, the system may behave like a decision point described above, though the decisions here tend to be on behavior resolution rather than content (a reference point can be created and the user can interact with the reference point).

In some embodiments, the interaction AI module 216 processes text that relates to how the generated content should be displayed (e.g., as opposed to what content to generate). The interaction AI module 216 may be implemented, at least in part, using one or more LLMs. For example, text that relates to how the content should be displayed may comprise instructions by the user 210 to zoom in or out, to rotate one or more displayed entities, to scroll to a different portion of generated content, to navigate to a different portion of generated content, to hide one or more elements for editing, and other things normally done using mouse and/or keyboard interactions. The user 210, in cooperation with the interaction AI module 216, can create different views 258 of the content and store such views to be referenced later. The interaction AI module 216 may enable the user to refer to reference points, to navigate in the timeline and to change views 258 automatically to assist the user interaction, as discussed further below. The different views 258 may comprise, for example, one or more visualizations of at least some of the underlying data structures (e.g., JSON files) that define the generated content, or another designated view.

The interaction AI module 216 may employ one or more conventions or instructions, such as employed terminology or operational defaults. For example, a user 210 may tell the voice and generative AI-based content design platform 205 that the terms "component" and "subsystem" are used interchangeably, or that whenever new entities are added, the voice and generative AI-based content design platform should switch the view to a zoomed-out graph view of the component where the entity is created.

Figure 3:
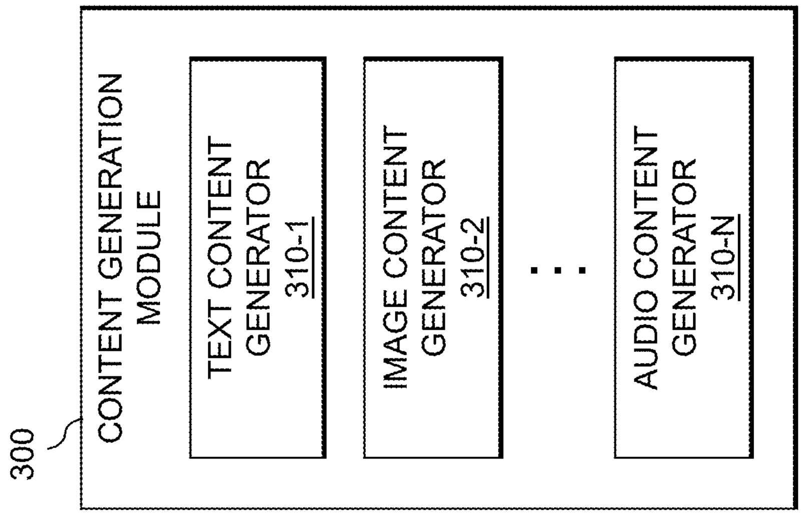
FIG. 3 illustrates the content generation module of FIG. 1 or 2 in further detail in accordance with an illustrative embodiment.

FIG. 3 illustrates an exemplary implementation of the content generation module of FIG. 1 or 2 in further detail in accordance with an illustrative embodiment. In the example of FIG. 3, the content generation module 300 comprises a plurality of content generators 310-1 through 310-N, such as a text content generator 310-1, an image content generator 310-2 and an audio content generator 310-N. Video and/or graphics content generators may also be provided, as would be apparent to a person of ordinary skill in the art.

In some embodiments, the content generators 310 may comprise one or more generative AI models, GPTs, LLMs, generative adversarial networks (GANs) and/or foundation models. The GPTs, for example, may be pre-trained using a training process applied to training data.

In one or more embodiments, the text content generator 310-1 may be implemented, for example, using a GPT-4 model from OpenAI, a LLaMA LLM, a PaLM2 LLM and/or a Gemini chatbot based on an LLM, or a combination of the foregoing. The image content generator 310-2 may be implemented, for example, using a CLIP neural network or a DALLE2 AI system from OpenAI, an ImageBind LLM, and/or an Imagen AI text-to-image generator, or a combination of the foregoing. The audio content generator 310-N may be implemented, for example, using a Whisper automatic speech recognition (ASR) system from OpenAI, a VoiceBox speech synthesis system, and/or a MusicLM AI music generation model, or a combination of the foregoing.

In at least one embodiment, the content generation module 300 may employ a router (e.g., implemented as an LLM that understands context) to selectively apply portions of the vocal input 220 of the user 210 (optionally, at least partially in a textual format 240) to one or more of the content generators 310, as appropriate. In other embodiments, at least portions of the vocal input 220 of the user 210 may be directly applied to one or more content generators 310 that understand when the applied portions of the vocal input 220 are applicable to them.

In at least some embodiments, one or more of the content generators 310 can be implemented using one or more pipelines. For example, an input may be applied to an LLM that generates an intermediate file (e.g., an output file in a JSON format) and the intermediate file may be applied to a given one of the content generators 310 (e.g., that generates a graph or an image out of the JSON file). In this manner, a multistep pipeline may be employed in which the input might not be directly applied to the content generator 310 that creates the actual output (or more generically, a content generator 310 may be used to provide an output, which may be used as an input for another content generator 310, as instructed, for example, by the user or by the nature of the content generator 310 itself).

Figure 4:
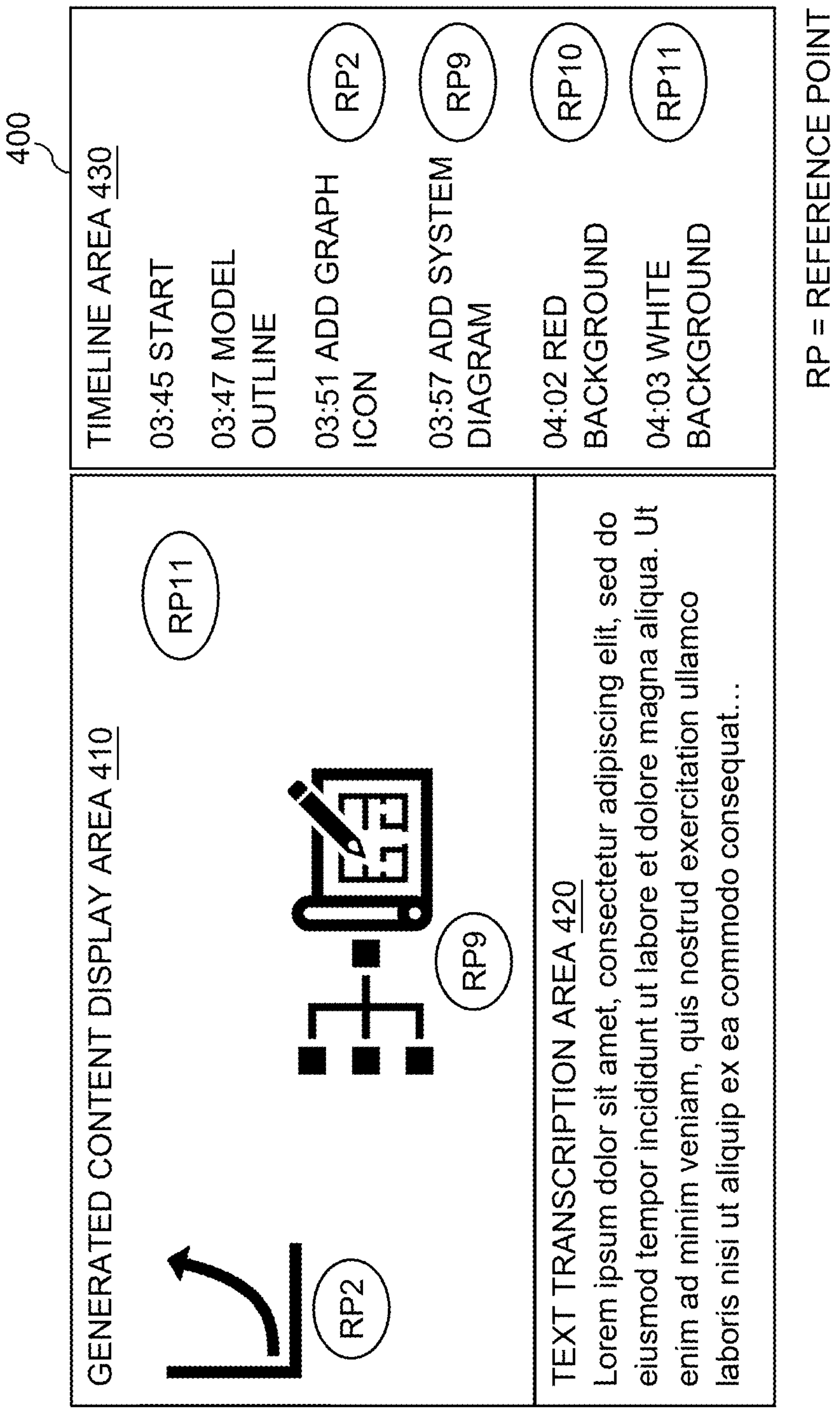
FIG. 4 illustrates a representative output of the voice and generative AI-based content design platform of FIG. 1 in accordance with an illustrative embodiment.

FIG. 4 illustrates a representative output 400 of the voice and generative AI-based content design platform 105 of FIG. 1 in accordance with an illustrative embodiment. In the example of FIG. 4, the representative output 400 of the voice and generative AI-based content design platform comprises a generated content display area 410, a text transcription area 420 and a timeline area 430.

In one or more embodiments, the timeline area 430 comprises one or more timestamped events related to the content being generated. The text transcription area 420 may comprise at least portions of the textual format 240 corresponding to the vocal input 220 of the user 210. The labeled circles (e.g., "RP2" or "RP9") in the generated content display area 410 and the timeline area 430 of FIG. 4 correspond to numbered reference points, as discussed above. For example, at a timestamp of 03:51, a graph icon was added to the generated content and reference point number two ("RP2") was associated with the entry in the timeline area 430 and the corresponding graph icon that was added to the generated content in the generated content display area 410. Similarly, at a timestamp of 03:57, a system diagram was added to the generated content and reference point number nine ("RP9") was associated with the entry in the timeline area 430 and the corresponding system diagram that was added to the generated content in the generated content display area 410. At a timestamp of 04:02, the background of the generated content was changed to red and reference point number ten ("RP10") was associated with the corresponding entry in the timeline area 430 and the red background of the generated content in the generated content display area 410. Further, at a timestamp of 04:03, the background of the generated content was changed from red to white and reference point number eleven ("RP11") was associated with the corresponding entry in the timeline area 430 and the white background of the generated content in the generated content display area 410.

In some embodiments, changes to the view selected by the user do not need to be placed in the timeline. In at least one embodiment, the prompts that are applied to one or more AI models employed herein may be continuously compared and the differences in such prompts may be employed to identify changes to add to the timeline.

FIG. 5 illustrates a representative AI model prompt 500 in accordance with an illustrative embodiment. In the example of FIG. 5, the AI model prompt 500 instructs one or more AI models that the role of the respective AI model is to parse instructions from a user and to generate and update content based on the instructions of the user. In addition, the AI model prompt 500 may instruct the one or more AI models that a timeline may be employed to provide a record of events and may allow users to traverse through time by selecting a given event in the timeline. Reference points may be used by the respective AI model to visually identify portions of the generated content. The generated content may be displayed to the user using different views based at least in part on user instructions regarding how the generated content should be displayed. The reference points may comprise decision points, split points, visual named placeholders and/or checker points, as discussed herein.

In one or more embodiments, when the instructions from the user create, delete and/or significantly modify an object in the generated content, the respective AI model may be instructed to add a brief description of the event in the timeline with a timestamp and to generate one or more corresponding reference points in the generated content. The respective AI model may be instructed to employ an output format that provides a visual output of the generated content for the user, and may be of the form shown in the generated content display area 410 of FIG. 4, and may be based at least in part on the user instructions and the view specified by the user, optionally with a representation of the instructions from the user (e.g., in the form of text transcription area 420 of FIG. 4) and a timeline (e.g., in the form of the timeline area 430 of FIG. 4) and one or more reference points (e.g., the numbered circles in FIG. 4).

Figure 6:
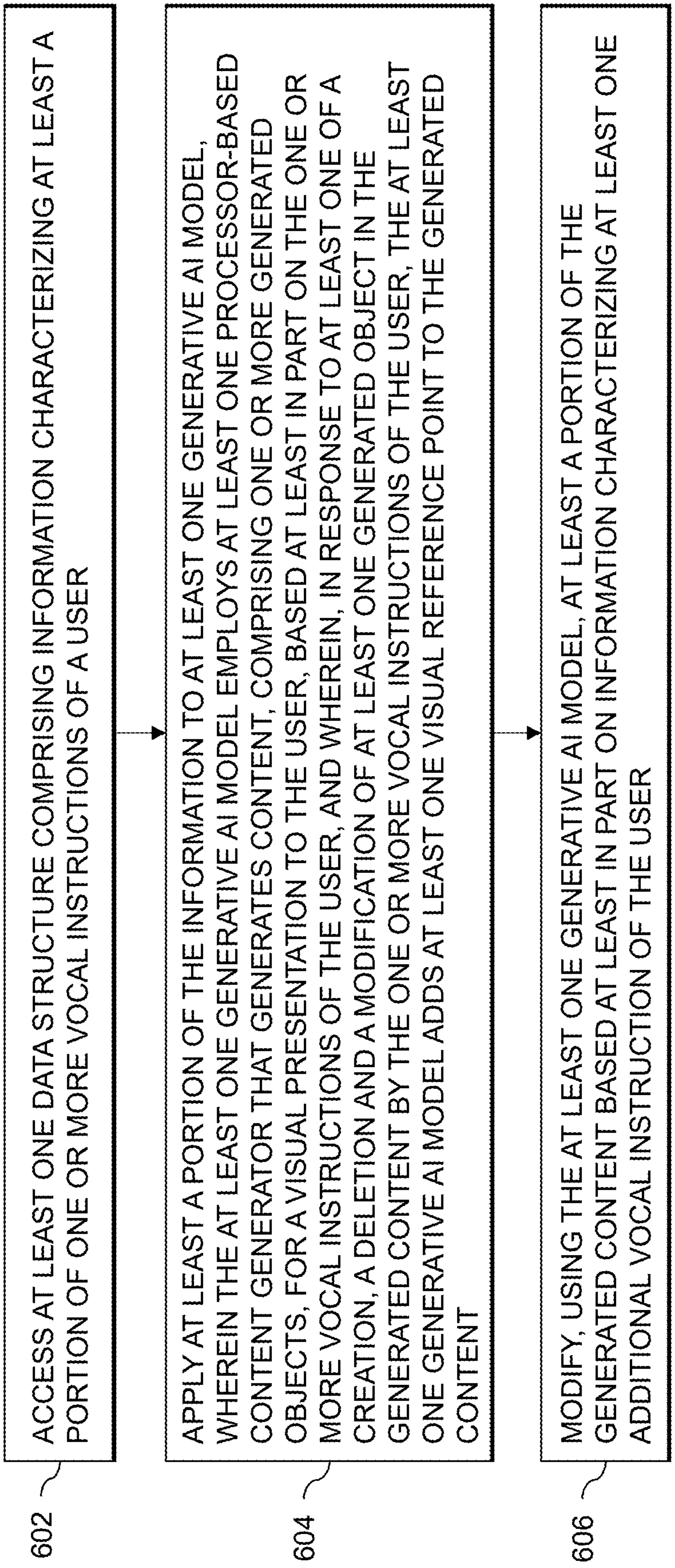
FIG. 6 is a flow diagram illustrating an exemplary implementation of a process for voice-based content design using generative AI techniques in accordance with an illustrative embodiment.

FIG. 6 is a flow diagram illustrating an exemplary implementation of a process for voice-based content design using generative AI techniques in accordance with an illustrative embodiment. In the example of FIG. 6, at least one data structure is accessed in step 602 comprising information characterizing at least a portion of one or more vocal instructions of a user. At least a portion of the information is applied in step 604 to at least one generative AI model. The at least one generative AI model employs at least one processor-based content generator (e.g., a text content generator, an image content generator and/or an audio content generator) that generates content, comprising one or more generated objects, for a visual presentation to the user. The generated content is based at least in part on the one or more vocal instructions of the user. In response to at least one of a creation, a deletion and a modification of at least one generated object in the generated content by the one or more vocal instructions of the user, the at least one generative AI model may add at least one visual reference point to the generated content.

In step 606, at least a portion of the generated content is modified, using the at least one generative AI model, based at least in part on information characterizing at least one additional vocal instruction of the user.

It should be noted that the term "data structure" as used herein is intended to be broadly construed. A data structure, such as any single one of or combination of the data structures referred to above, may provide a portion of a larger data structure, or any one of or combination of the data structures may be combinations of multiple smaller data structures. Therefore, the data structures referred to above may be different parts of a same overall data structure, or one or more of the data structures could be made up of multiple smaller data structures. The data structures may include tables, vectors, embeddings, or various other data structures. In some embodiments, the data structures are specifically formatted or generated such that they are suitable for use as at least one of an input to and an output from an ML model. It should further be appreciated that "generating" a data structure may encompass, for example, populating an existing or previously-created data structure with one or more data items and that "accessing" a data structure may encompass, for example, obtaining a portion (e.g., one or more data items) of one or more data structures by means of a query, select or filter operation, for example.

In at least one embodiment, the at least one generative AI model is further configured to present a timeline on the display identifying one or more events. A user can select at least one of the events in the timeline to update one or more properties associated with the at least one event. At least one of the one or more events may have an associated timestamp.

In one or more embodiments, the at least one visual reference point in the generated content comprises one or more of a decision point, a split point, a named placeholder and a checker point. The at least one visual reference point in the generated content may comprise a decision point and wherein the decision point is associated with one or more of at least one assumed value and at least one value having a likelihood to change that exceeds at least one designated likelihood criteria. The at least one visual reference point in the generated content may comprise a split point and wherein the split point corresponds to multiple parallel options for at least one generated object. The at least one visual reference point in the generated content may comprise a named placeholder and wherein the named placeholder is associated with at least one object having at least one uncertain value that exceeds at least one designated uncertainty criteria. The at least one visual reference point in the generated content may comprise a checker point and wherein the checker point is associated with at least one object having one or more of missing information and contradictory information.

In some embodiments, the at least one generative AI model is further configured to present the generated content in accordance with a designated view based at least in part on one or more user instructions indicating how the generated content should be displayed. The information characterizing the one or more vocal instructions may comprise one or more of a vocal representation and a textual representation of the one or more vocal instructions. The at least one generative AI model may respond asynchronously to a stream of vocal instructions of the user, comprising a plurality of vocal instructions (e.g., an unlimited number or duration of vocal instructions), using at least one non-verbal response. In this manner, the user can provide a stream of vocal instructions and does not need to wait for a system response before proceeding with additional instructions (e.g., as is normally necessary in existing synchronous and/or turn-based systems).

The particular processing operations and other network functionality described in conjunction with FIGS. 2, 5 and 6, for example, are presented by way of illustrative example only, and should not be construed as limiting the scope of the disclosure in any way. Alternative embodiments can use other types of processing operations for voice-based content design using generative AI techniques. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

The content generation module of FIG. 1 may continuously generate the content according to the provided transcript. If the content generation is fast enough, the user will see the updated content in near real-time. In some implementations, there may be a noticeable delay between the user input and the time when the changes associated with the user input are reflected in the display. The disclosed UX paradigm is designed to address the differences between the user's expectations and the generated output and allows the user to continue just the same. Anything in the generated content that the user wants to be modified may be stated later (with or without reference points). The response time may be a function of the speed of the generators (e.g., GPT-based generators) employed by the content generation module, for example, and the available hardware resources that perform the content generation. The more resources that are employed to generate the content will result in a reduction of the time delay described above. There can also be multiple content generators of the same type to provide preferences or to utilize certain advantages of some content generators in specific contexts.

In one or more embodiments, content generation optimizations may be employed. For example, resolution and level of detail content generation optimizations may be employed, whereby it may be sufficient for a given content generation project that rough sketches or lower-resolution rendering is performed until the input stream for a given area ends. The content generation may be substantially faster, and as input is still coming in, it is a tradeoff between accuracy and response time. Once enough user input has been received by the interactive voice-based content design platform, previous generations can be discarded and a new low-resolution or low detail may be initiated. Details and resolution can improve over time as a function of the stability of the input in that area.

In addition, partial generation content generation optimizations may be employed, where the locality of the changes is identified, and only relevant portions of the model are regenerated. As the models increase in size and complexity, partial generation techniques provide substantial time and resource savings.

Further, view filter content generation optimizations may be employed, where only the portions of the model that are visible in the current view need to be regenerated in real-time. The remainder of the model can slowly catch up. This is true, especially with graphical models where the user view is the main perspective of changes to the user. However, if it is a logical model (rather than a graphical one) then the view is less central to the understanding of the model. Granted, logical models render substantially faster. If there are multiple active views, then the aggregate areas of all the views are prioritized first.

As models and generated content evolve, it becomes difficult to view all the content on one page or screen, and possibly even from the same perspective. Large architecture models may have per component "zoom in" needs and a wider "system" view. Visualizations may also vary by type of rendering, such as graphics, text, three-dimensional renderings and/or flat renderings.

The user interaction allows both describing how things should be viewed but also naming the display mode to create a "view" (e.g., a bookmark of the visualization). The interaction AI module 216 can reference and apply previously defined views allowing swift and efficient interaction with the visual system.

In some embodiments, the transcript is a verbatim stream reflecting the input. There may be some entities with long descriptions or short descriptions. There may be instructions for movements between views without actually changing anything in the model being produced.

The timeline tool may be employed to create a time-stamped list of significant events during the evolution of the model. The time-stamped list can contain model-changing events and interaction events (which may optionally be filtered, for example, by a significance score). Newly created reference points may appear as line items in the timeline (although all reference points do not necessarily have to appear there, but reference points usually correlate to significant events). Entries in the timeline may be brief in nature. The generator LLM capabilities may be employed to create short descriptions for use in the timeline.

In at least one embodiment, the timeline can display events and also move around in time to revisit older choices or assumptions (which will then re-render all the models). The changes may not alter the actual timeline (it will have a new entry at the end of the timeline) but rather the changes may be applied as if the changes were made at the original time. The UX of the timeline allows users to control the granularity of the displayed items. Going to a coarse resolution displays fewer items with more importance, while a higher resolution provides more detailed items. It is possible to display higher resolution items as a hierarchy collapsing finer resolution items in lower levels of the tree.

While the vocal input 220 of the user 210 may have all of the information, inputs may have been given out of order, and over time in multiple places. Items may have been set and then overridden and so on. As all of the information and all of the changes are available, the LLM can optionally be used to regenerate a text description that will contain the information in an ordered and consolidated form. Moreover, the resulting text can be given as an input and compared to the original output to ensure that the new full representation is indeed a proper one (adjustments to the description may be done to converge to a common output). In addition, summaries of the whole system or parts of the system can be produced. Both the full description and summaries may contain text, images, videos, or any other artifacts as needed.

Similar to the descriptions provided above, system documentation can be automatically generated. One difference is the point of view of the generated result: whereas the description/summaries are from the designer/architect/user of the disclosed interactive system, documentation would be generated from the perspective of the consumer of the result (e.g., if the interactive voice-based content design system is used to design a backup software system, the documentation would be from the perspective of the user of the backup system).

Any point in the transcript may be marked to create a "version." The version consists of all inputs up to that point. A version may have a name or number to identify it. As opposed to a reference point, a version cuts off all input after the indicated point in time. Going back to a version effectively truncates the input stream. Multiple versions may exist in parallel and even splits from a version can be supported (e.g., go back to a version and add a new input) that will split the input transcript at the point of the version.

When there are multiple versions, multiple projects, or split reference points, there are effectively multiple parallel instances of the project. The system can compare and contrast the multiple parallel instances of the project to highlight the commonalities and/or differences between these instances. For example, the commonalities and/or differences may be obtained by identifying the differences in the transcript of the instances; generating full descriptions of the instances and then identifying the differences between these descriptions; and/or comparing generated outputs. Regardless of the implementation, the comparisons can highlight key areas and allow copying and merging of areas by appending the text of the difference into the Transcript.

The disclosed interactive voice-based content design platform is not limited to a single user. Multiple users may design and/or collaborate in a single conversation or work independently and in parallel. Users may see the stream they are working on or other input streams from other users. Elements may be tagged with user context to control permissions and access. Users may have their own timeline or look at a combined and merged timeline of the project.

A continuous UX interaction model is provided to create complex projects and models. The disclosed interactive voice-based content design system employs LLMs and generative AI techniques, for example, in multiple ways to achieve the desired experience and outcome. The UX is significantly different from the turn/command-based models. A vocal input 220 is provided by a user 210, with visual stimuli from the system for interaction (e.g., rather than voice as well). The generated content is continuously regenerated while the user vocal input is received, optionally with one or more optimizations applied. Visual cues may provide reference points, split points, and placeholders. A timeline is provided in some embodiments, that may include moving through time and versioning. Meeting recordings, videos, and other non-system-related interactions may be used as input into the interactive voice-based content design system. The disclosed interactive voice-based content design system may be used to configure complex systems, as well as for modeling complex and abstract ideas, creating diagrams or visual designs, writing documents, creating presentations, and more.

Embodiments described herein can provide improved techniques for continuous interactive voice-based content design using generative AI. Improved techniques for user interaction are provided where the user and the system create a continuous feedback loop while generating inputs to the process and making adjustments to the generated content accordingly. There are visual cues that may be presented to facilitate the interaction, and an editable timeline of assumptions and decisions that can be modified at any time to reevaluate the generated output.

One or more embodiments of the disclosure provide improved methods, apparatus and computer program products for voice-based content design using generative AI techniques. The foregoing applications and associated embodiments should be considered as illustrative only, and numerous other embodiments can be configured using the techniques disclosed herein, in a wide variety of different applications.

It should also be understood that the disclosed techniques for voice-based content design using generative AI, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for voice-based content design using generative AI may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based voice-based content design engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based vocal content design platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
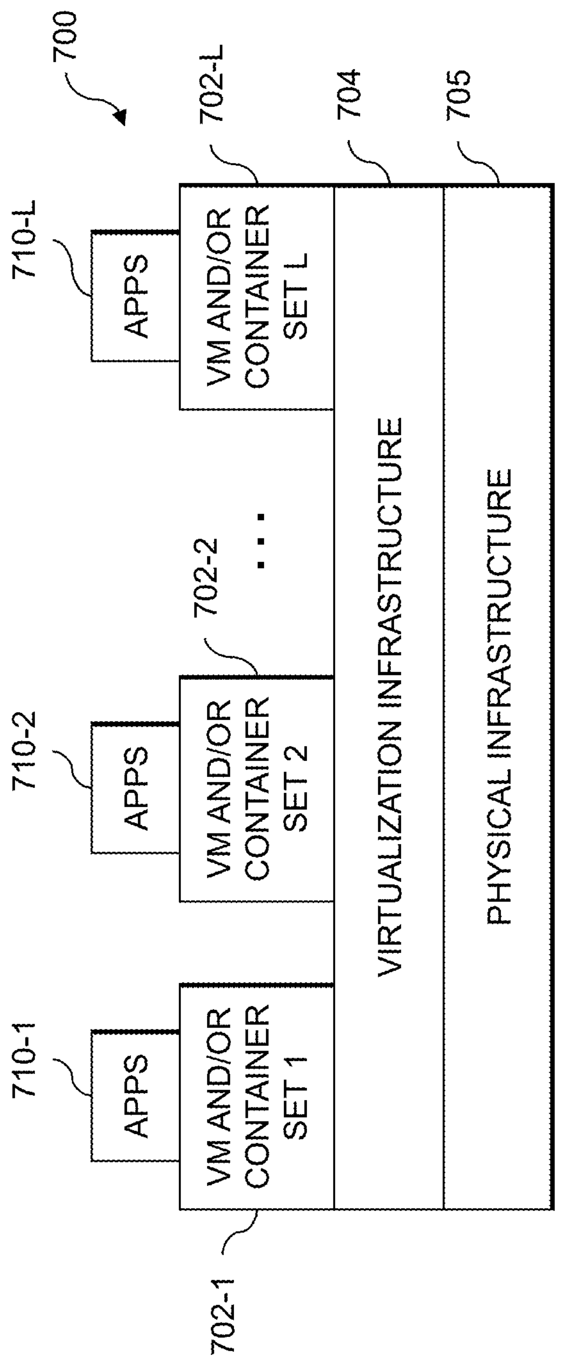
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide voice-based content design functionality of the type described above for one or more processes running on a given one of the VMs. For example, each of the VMs can implement control logic for voice-based content design and associated functionality for adding visual reference points to such designs.

An example of a hypervisor platform that may be used to implement a hypervisor within the virtualization infrastructure 704 is a compute virtualization platform which may have an associated virtual infrastructure management system such as server management software. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide voice-based content design functionality of the type described above for one or more processes running on different ones of the containers. For example, a container host device supporting multiple containers of one or more container sets can implement one or more instances of control logic for voice-based content design and associated functionality for adding visual reference points to such designs.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA, a CPU, a GPU, a TPU, a VPU, an NPU, a DPU, an SOC or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage drive or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
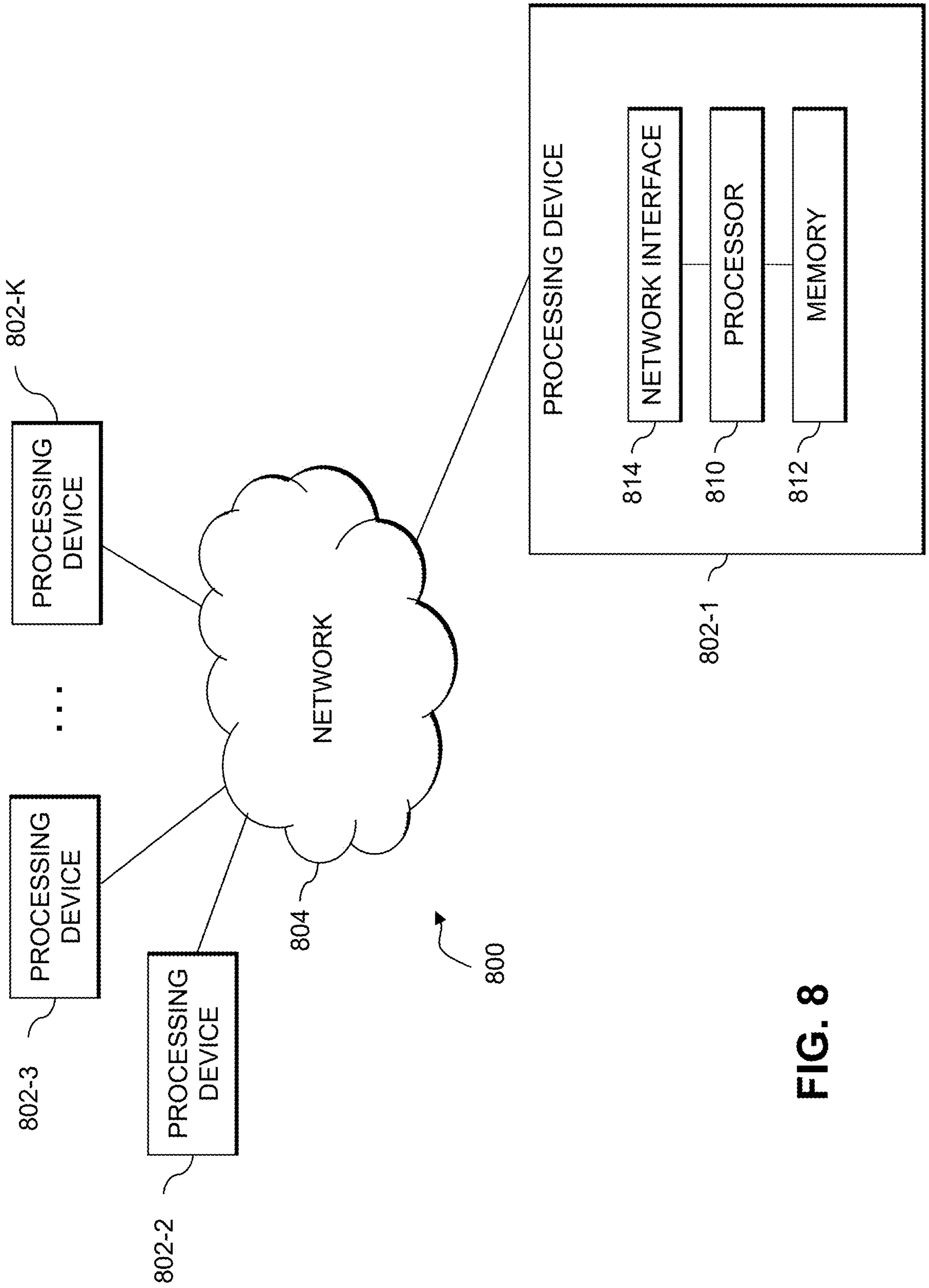
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

accessing at least one data structure comprising information characterizing at least a portion of one or more vocal instructions of at least one user, wherein the one or more vocal instructions of the at least one user comprise one or more vocal instructions describing visual content to be generated, wherein the one or more vocal instructions describing the visual content to be generated comprise a vocal description of one or more visual properties of at least one object to be generated;

applying at least a portion of the information to at least one generative artificial intelligence (AI) model, wherein the at least one generative AI model employs at least one processor-based content generator that generates visual content, comprising one or more generated objects, for a visual presentation to the at least one user, based at least in part on the one or more vocal instructions of the at least one user describing the visual content to be generated, and wherein, in response to at least one of a creation, a deletion and a modification of at least one generated object in the generated visual content by the one or more vocal instructions of the at least one user, the at least one generative AI model adds at least one visual reference point to the generated visual content, wherein the at least one visual reference point enables the at least one user to interact with the generated visual content to one or more of confirm, revisit and modify the at least one generated object; and modifying, using the at least one generative AI model, at least a portion of the generated visual content based at least in part on information characterizing at least one additional vocal instruction of the at least one user describing modifications to at least a portion of the generated visual content;

wherein the method is performed by at least one processing device comprising a processor coupled to a memory.

2. The method of claim 1, wherein the at least one generative AI model is further configured to present a timeline on a display identifying one or more events.

3. The method of claim 2, wherein the at least one user can select at least one of the events in the timeline to update one or more properties associated with the at least one event.

4. The method of claim 2, wherein at least one of the one or more events has an associated timestamp.

5. The method of claim 1, wherein the at least one visual reference point in the generated visual content comprises one or more of a decision point, a split point, a named placeholder and a checker point.

6. The method of claim 5, wherein the at least one visual reference point in the generated visual content comprises a decision point and wherein the decision point is associated with one or more of at least one assumed value and at least one value having a likelihood to change that exceeds at least one designated likelihood criteria.

7. The method of claim 5, wherein the at least one visual reference point in the generated visual content comprises a split point and wherein the split point corresponds to multiple parallel options for at least one generated object.

8. The method of claim 5, wherein the at least one visual reference point in the generated visual content comprises a named placeholder and wherein the named placeholder is associated with at least one generated object having at least one uncertain value that exceeds at least one designated uncertainty criteria.

9. The method of claim 5, wherein the at least one visual reference point in the generated visual content comprises a checker point and wherein the checker point is associated with at least one generated object having one or more of missing information and contradictory information.

10. The method of claim 1, wherein the at least one generative AI model is further configured to present the generated visual content in accordance with a designated view based at least in part on one or more user instructions indicating how the generated visual content should be displayed.

11. The method of claim 1, wherein the information characterizing the one or more vocal instructions comprises one or more of a vocal representation and a textual representation of the one or more vocal instructions.

12. The method of claim 1, wherein the at least one generative AI model responds asynchronously to a stream of vocal instructions of the at least one user, comprising a plurality of vocal instructions, using at least one non-verbal response.

13. An apparatus comprising:

at least one processing device comprising a processor coupled to a memory;

the at least one processing device being configured to implement the following steps:

accessing at least one data structure comprising information characterizing at least a portion of one or more vocal instructions of at least one user, wherein the one or more vocal instructions of the at least one user comprise one or more vocal instructions describing visual content to be generated, wherein the one or more vocal instructions describing the visual content to be generated comprise a vocal description of one or more visual properties of at least one object to be generated;

applying at least a portion of the information to at least one generative artificial intelligence (AI) model, wherein the at least one generative AI model employs at least one processor-based content generator that generates visual content, comprising one or more generated objects, for a visual presentation to the at least one user, based at least in part on the one or more vocal instructions of the at least one user describing the visual content to be generated, and wherein, in response to at least one of a creation, a deletion and a modification of at least one generated object in the generated visual content by the one or more vocal instructions of the at least one user, the at least one generative AI model adds at least one visual reference point to the generated visual content, wherein the at least one visual reference point enables the at least one user to interact with the generated visual content to one or more of confirm, revisit and modify the at least one generated object; and modifying, using the at least one generative AI model, at least a portion of the generated visual content based at least in part on information characterizing at least one additional vocal instruction of the at least one user describing modifications to at least a portion of the generated visual content.

14. The apparatus of claim 13, wherein the at least one generative AI model is further configured to present a timeline on a display identifying one or more events, wherein the at least one user can select at least one of the events in the timeline to update one or more properties associated with the at least one event.

15. The apparatus of claim 13, wherein the at least one visual reference point in the generated visual content comprises one or more of a decision point, a split point, a named placeholder and a checker point.

16. The apparatus of claim 13, wherein the at least one generative AI model is further configured to present the generated visual content in accordance with a designated view based at least in part on one or more user instructions indicating how the generated visual content should be displayed.

17. The apparatus of claim 13, wherein the at least one generative AI model responds asynchronously to a stream of vocal instructions of the at least one user, comprising a plurality of vocal instructions, using at least one non-verbal response.

18. A non-transitory processor-readable storage medium having stored therein program code of one or more software programs, wherein the program code when executed by at least one processing device causes the at least one processing device to perform the following steps:

accessing at least one data structure comprising information characterizing at least a portion of one or more vocal instructions of at least one user, wherein the one or more vocal instructions of the at least one user comprise one or more vocal instructions describing visual content to be generated, wherein the one or more vocal instructions describing the visual content to be generated comprise a vocal description of one or more visual properties of at least one object to be generated;

applying at least a portion of the information to at least one generative artificial intelligence (AI) model, wherein the at least one generative AI model employs at least one processor-based content generator that generates visual content, comprising one or more generated objects, for a visual presentation to the at least one user, based at least in part on the one or more vocal instructions of the at least one user describing the visual content to be generated, and wherein, in response to at least one of a creation, a deletion and a modification of at least one generated object in the generated visual content by the one or more vocal instructions of the at least one user, the at least one generative AI model adds at least one visual reference point to the generated visual content, wherein the at least one visual reference point enables the at least one user to interact with the generated visual content to one or more of confirm, revisit and modify the at least one generated object; and modifying, using the at least one generative AI model, at least a portion of the generated visual content based at least in part on information characterizing at least one additional vocal instruction of the at least one user describing modifications to at least a portion of the generated visual content.

19. The non-transitory processor-readable storage medium of claim 18, wherein the at least one generative AI model is further configured to present a timeline on a display identifying one or more events, wherein the at least one user can select at least one of the events in the timeline to update one or more properties associated with the at least one event.

20. The non-transitory processor-readable storage medium of claim 18, wherein the at least one generative AI model responds asynchronously to a stream of vocal instructions of the at least one user, comprising a plurality of vocal instructions, using at least one non-verbal response.

* * * * *